(12) United States Patent
Greener (10) Patent No.: US 9,400,380 B2
(45) Date of Patent: Jul. 26, 2016

(54) BINOCULAR APPARATUS AND METHOD

(71) Applicant: William Greener, Ithaca, NY (US)

(72) Inventor: William Greener, Ithaca, NY (US)

( * ) Notice: Subject to any disclaimer, the term of this patent is extended or adjusted under 35 U.S.C. 154(b) by 65 days.

(21) Appl. No.: 13/866,441

(22) Filed: Apr. 19, 2013

(65) Prior Publication Data

US 2013/0286475 A1     Oct. 31, 2013

Related U.S. Application Data (60) Provisional application No. 61/638,155, filed on Apr. 25, 2012.

(51) Int. Cl.
  *G02B 23/16*     (2006.01)
  *G02B 23/02*     (2006.01)

(52) U.S. Cl.
  CPC ............... *G02B 23/16* (2013.01); *G02B 23/02* (2013.01)

(58) Field of Classification Search
  CPC ........ G02B 23/12; G02B 23/16; G02B 23/18; G02B 23/20; G02B 23/22; G02B 23/125; G02B 25/004; G02B 27/1072; G02B 23/02
  USPC .......................................... 359/407, 411–418
  See application file for complete search history.

(56) References Cited

U.S. PATENT DOCUMENTS

| | | | | |
|---|---|---|---|---|
| 5,706,070 A | * | 1/1998 | Reich et al. | 351/201 |
| 5,852,291 A | * | 12/1998 | Thomas | 250/214 VT |
| 5,923,467 A | * | 7/1999 | Pericic et al. | 359/411 |
| 7,062,796 B1 | * | 6/2006 | Dixon | 2/426 |

* cited by examiner

*Primary Examiner* — Bumsuk Won
*Assistant Examiner* — Wen Huang
(74) *Attorney, Agent, or Firm* — William Greener; Bond, Schoeneck & King, PLLC (57) ABSTRACT

A binocular-type viewing apparatus designed in such a manner that a user, wanting to view an object located at a distance above the viewer's horizontal line of sight, need only direct his/her view downward into the apparatus to view the elevated object. Thus the eyepiece component has an optical axis inclined downwardly and an objective optical component of the apparatus has an optical axis inclined upwardly. An optical structure is disposed between the objective and the eyepiece to redirect the image optical path from the objective optical component to the eyepiece component and into the viewer's eyes. The binocular may have a fixed deviated optical axis or a variably adjustable optical axis from in-line up to or exceeding 90 degrees.

12 Claims, 10 Drawing Sheets

BINOCULAR APPARATUS AND METHOD

The instant application claims priority to U.S. provisional application Ser. No. 61/638,155 filed Apr. 25, 2012, the subject matter of which is hereby incorporated by reference in its entirety.

Embodiments of the invention pertain most generally to the field of image-forming optics; more particularly to binocular apparatus and, most particularly to binoculars that enable magnified viewing of an elevated object without the user's need to tilt their head back and look upward.

Binoculars, like telescopes, are line-of-sight devices; i.e., the optical axis of the exit pupil is either collinear with or parallel to the optical axis of the entrance pupil. Thus to view an object at an angle substantially above the viewer's (person's) horizontal line of sight, the viewer must tilt their head back to orient the device optical axis or axes at the object (when the device is held/supported by the viewer rather than being mounted in a tripod, for example). This is the case, for example, for both roof prism- and porro prism-type binoculars. Binoculars, however, unlike a telescope (e.g., spotting scope) and particularly, a mounted 'scope,' are often used to view objects in motion (e.g., flying or swimming birds) rather than relatively stationary objects. As such, their use not only invokes their weight, but also brings into play inertia and torque.

The best binoculars in terms of optical parameters (e.g., clarity, image brightness, magnification, resolution, field of view, and other known characterizing parameters) typically are also the heaviest. This is due, in part, to the large clear aperture dimensions of the objective and eyepiece, the incorporation of glass lenses and/or prisms and/or mirrors, and housing design and construction.

A problem with heavy binoculars is that they are 'heavy,' even when used to view a stationary object (because they must be held/supported by the user), and require even more strength to use to view a moving object. A bird watcher, for example, viewing a warbler in a tree-top, must not only hold the binoculars (as steady as possible) in an upwardly-pointing position for a (often relatively long) period of time, but must also spend said (relatively long) period of time with their head tilted back and upward, which may be uncomfortable and also puts significant strain on the viewer's back, shoulders, neck, and other body parts. This stress is amplified if viewing a bird or other non-stationary object in flight or moving. Furthermore, for example, as people age it is not only physically more difficult to spend periods of time in 'bent' positions (e.g., looking up) while holding up a heavy (e.g., ≥40 ounces) apparatus, but eyesight typically worsens over time, thus viewers prefer binoculars or other viewing devices that provide the best optical quality (and are thus the heaviest, bulkiest, etc.).

It would be particularly advantageous to have an hand-held optical viewing apparatus for viewing distant objects close-up, such as, e.g., binoculars, that would allow the viewer to look at an object inclined at an angle to the horizontal (e.g., a bird in a tree top) without the viewer having to tilt or cock their head (or torso) in an awkward or unnatural (e.g., tilted back) position while also having to freely (or nearly so) support a relatively heavy optical apparatus in their hands up at eye level. It would be further advantageous if such optical viewing apparatus was capable of being used as a straight (undeviated) viewing apparatus such as a typical pair of binoculars.

As used herein, an 'elevated object' refers to an object to be viewed that is at an azimuth with respect to the viewer's horizontal line of sight.

A non-limiting, illustrative embodiment of the invention is a hand-held, (e.g., non-stationary; i.e. non-mounted or otherwise supported except by the viewer's physical holding or support of the apparatus) optical apparatus used for magnified viewing of a distant, elevated object, which has an eyepiece component having an eyepiece optical axis and an objective component having an objective optical axis, in a housing, wherein the eyepiece component optical axis and the objective component optical axis are deviated; i.e., neither parallel nor collinear, or at least disjointable; i.e., the axes can be adjusted to intersect at an angle. Such optical apparatus will have an optical structure adapted to transfer the image optical path from the objective component to the viewing (eyepiece) component and into the viewer's eyes. Such structure may include one or more similar or different prisms, mirrors, relay lenses, flexible optical fiber bundle(s), and other known optical components used in optical imaging systems. In an aspect, these axes lie in planes that intersect at a location in-between the location of the eyepiece component and the objective component such that the objective optical path plane and the eyepiece optical path plane are deviated and form, e.g., a symmetric or non-symmetric 'V' shape. In an aspect, the planes are fixedly deviated. The optical image path through the objective to the eyepiece may include more than two rectilinear segments in order to optimize the position of the viewing (eyepiece) component in relation to the viewer's eyes and the ergonomic conditions of positioning the apparatus for effective use. The apparatus housing may have a functional shape or contour that facilitates use of the viewing apparatus; e.g., a portion or section of the surface of the housing may rest against a region of the viewer's chest or shoulders. Such portion or section of the housing may be curved or otherwise shaped or contoured to assist in orienting the line of sight of the objective component and/or stabilizing the viewing apparatus. The viewing apparatus may be adjustable between a deviated line of sight and a straight line of sight such that the eyepiece optical axis and the objective optical axis are in-line or disjointed, wherein the apparatus would function like a typical (fixed) telescope or pair of binoculars. The optical structure to transfer the image optical path from the objective component to the viewing (eyepiece) component may include a flexible fiber bundle with or without additional lenses, mirrors, prisms, or the like.

In an embodiment, the eyepiece component may be replaced by a display screen component that displays an image of the distant object, wherein an optical axis (e.g., viewing axis) of the display screen component is neither parallel to nor collinear with the objective component optical axis, but rather these axes lie in planes that intersect at a location in-between the location of the display screen component and the objective component. In a non-limiting aspect, the objective optical axis is horizontal or inclined at a positive (upward from horizontal) angle and the viewing component optical axis is inclined at a negative (downward from horizontal) angle.

In all embodiments, the apparatus may include a sighting aide such as but not limited to a laser pointer, aiming markings, or other aiming indicia as known in the art.

An embodiment of the invention is a binocular apparatus that includes a housing; an eyepiece component having an eyepiece optical axis; an objective component having an objective optical axis; and an image transfer component disposed between and optically coupled to the eyepiece component and the objective component, wherein the eyepiece component optical axis and the objective component optical axis are neither parallel nor collinear. In various exemplary, non-limiting aspects the apparatus may further include or be characterized by the following features and/or characteristics:

wherein the eyepiece component optical axis and the objective component optical axis are disposed at an angle that is greater than zero degrees and equal to or less than about 90 degrees (the term 'about' being understood to mean 90 degrees±2-4 degrees);

wherein the angle is adjustable;

wherein the image transfer component is a flexible optical fiber bundle.

An embodiment of the invention is a binocular apparatus that includes a housing; an eyepiece component having an eyepiece optical axis; an objective component having an objective optical axis; and an image transfer component disposed between and optically coupled to the eyepiece component and the objective component, wherein the eyepiece component optical axis and the objective component optical axis are adjustable between an orientation where they are neither parallel nor collinear to an orientation where they are substantially or exactly parallel or collinear (i.e., in-line). In various exemplary, non-limiting aspects the apparatus may further include or be characterized by the following features and/or characteristics:

wherein the image transfer component is a flexible optical fiber bundle.

An embodiment of the invention is a method for magnified viewing of an object using an optical magnifying apparatus that includes an objective component having an objective optical axis and a viewing component (e.g., eyepiece component; electronic display component) having a viewing component optical axis in which these axes are neither parallel nor collinear, but rather lie in planes that intersect at a location in-between the location of the viewing component and the objective component, and looking into the optical magnifying apparatus along the viewing component optical axis in order to view the magnified image of the object. In a non-limiting aspect, the objective optical axis is horizontal or inclined at a positive (upward from horizontal) angle and the viewing component optical axis is inclined at a negative (downward from horizontal) angle.

FIGS. 2a, b, respectively, schematically illustrate two known beam deviating and erecting prisms;

The disclosed non-limiting, exemplary embodiments are described in the form of binoculars or binocular-type viewing apparatus and associated methods; however, the teachings of the disclosure need not be limited to binocular-type viewing apparatus and methods and may comprise, for example, monocular viewing apparatus and methods.

Figure 1:
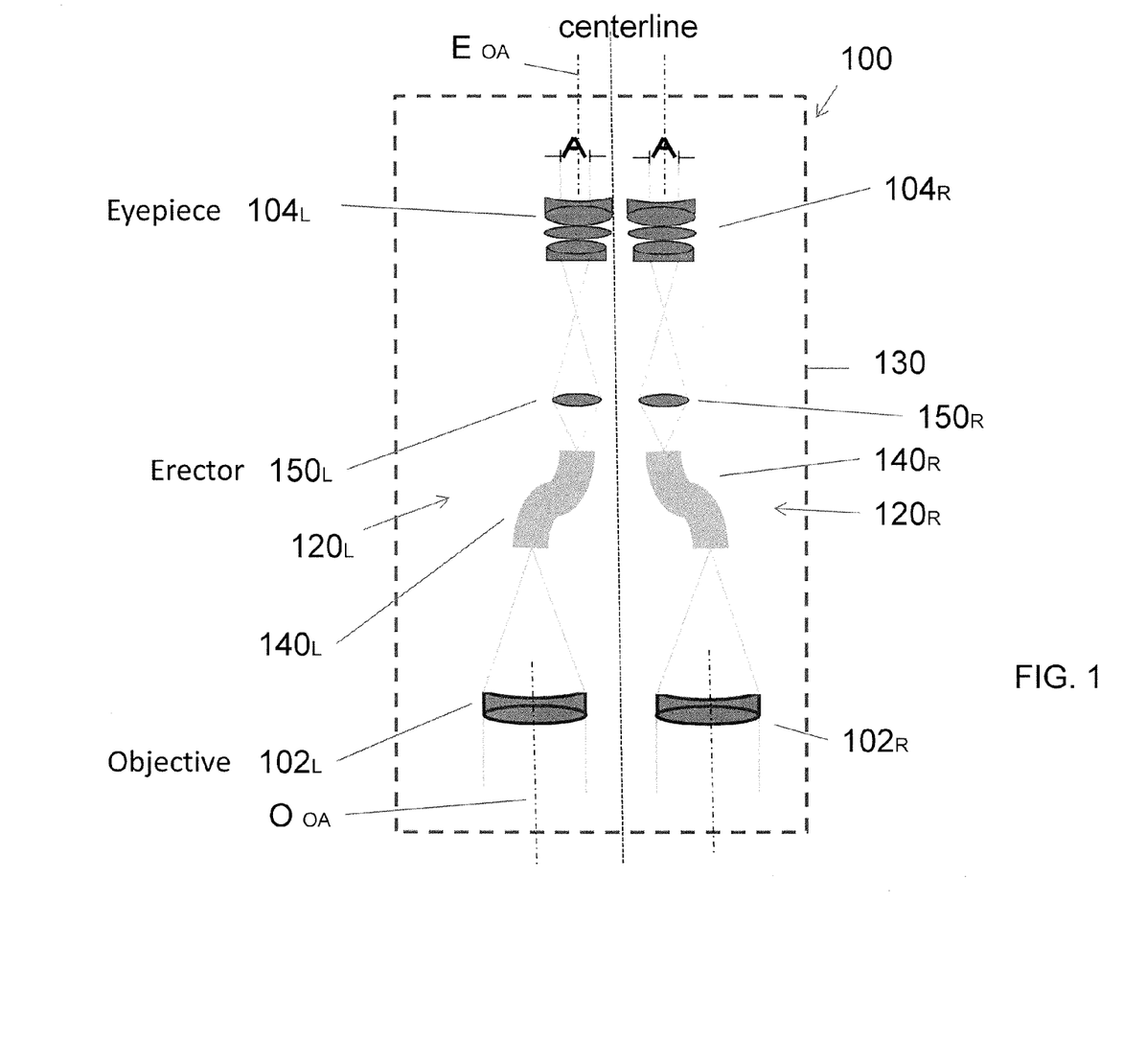
FIG. 1 is a schematic, cross sectional view of an optical viewing apparatus, according to an illustrative embodiment of the invention.

An embodiment of the apparatus is a binocular 100 as generally depicted in FIG. 1. Binocular 100 includes a pair of identical or mirror-symmetrical telescopes (monoculars) $120_L$, $120_R$ mounted side-by-side and aligned to point accurately in the same direction, allowing the viewer to use both eyes (binocular vision) when viewing a distant object. Each respective monocular 120 includes an objective component $102_R$, $102_L$ and a viewing component $104_R$, $104_L$, which in this non-limiting aspect are eyepiece components. Each objective component has an objective optical axis $O_{OA}$ and each eyepiece component has an eyepiece optical axis $E_{OA}$. As in typical binoculars or a telescope, the objective optical axis (or axes) $O_{OA}$ is aligned along the line of sight of the object to be viewed. However, unlike in a porro prism style binocular in which the eyepiece component optical axis is displaced from but parallel to the objective optical axis, the eyepiece component optical axis and the objective component optical axis lie in planes that intersect at a location in-between the location of the eyepiece component and the objective component, as illustrated, for example in FIG. 3.

Figure 2:
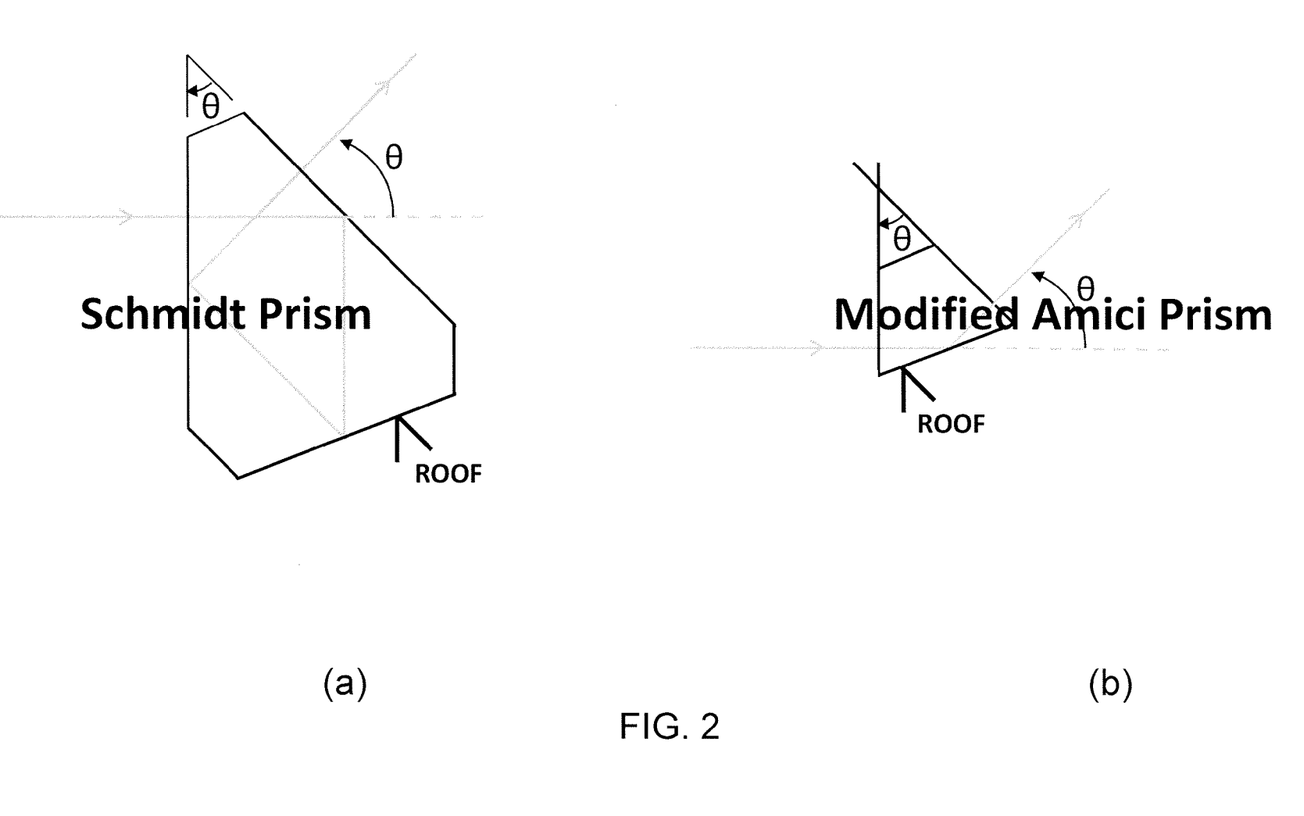

The monoculars or telescopes 120 are disposed individually or collectively in a housing 130. In each monocular, an optical component or optical system $140_{(R, L)}$ is disposed in the housing between the objective component 102 and the eyepiece component 104 to direct the imaging light path of the objective component to become the imaging light path of the eyepiece component. This function may be accomplished via a variety of optical structures known in the art including, but not limited to, at least one or more prisms and/or mirrors and/or lenses, and/or waveguides (e.g., fiber bundle), and/or gratings used alone or in various combinations. For example, FIG. 2a illustrates in cross section a Schmidt prism that deviates the optical axis by an angle θ and erects the image (FIG. 3a). FIG. 2b similarly illustrates a modified Amici prism. In both examples, the prism apex angle θ determines the angle of beam deviation. As further illustrated in FIG. 1, each telescope may include an image erector component $150_{(R, L)}$ located between the respective optical component or optical system 140 and eyepiece components 104.

Thus in accordance with the embodied invention, a user (viewer) can hold the binocular at chest level, for example, or perhaps rest the apparatus against his/her chest, and look into the eyepiece (viewing component) by tilting their head slightly downward (i.e., at a negative angle to the horizontal) while viewing an object whose line of sight is at a positive angle to the horizontal (FIG. 3b).

In an aspect, the apparatus will be equipped with focus control and other opto-mechanical controls similarly found on high quality binoculars.

Figure 3:
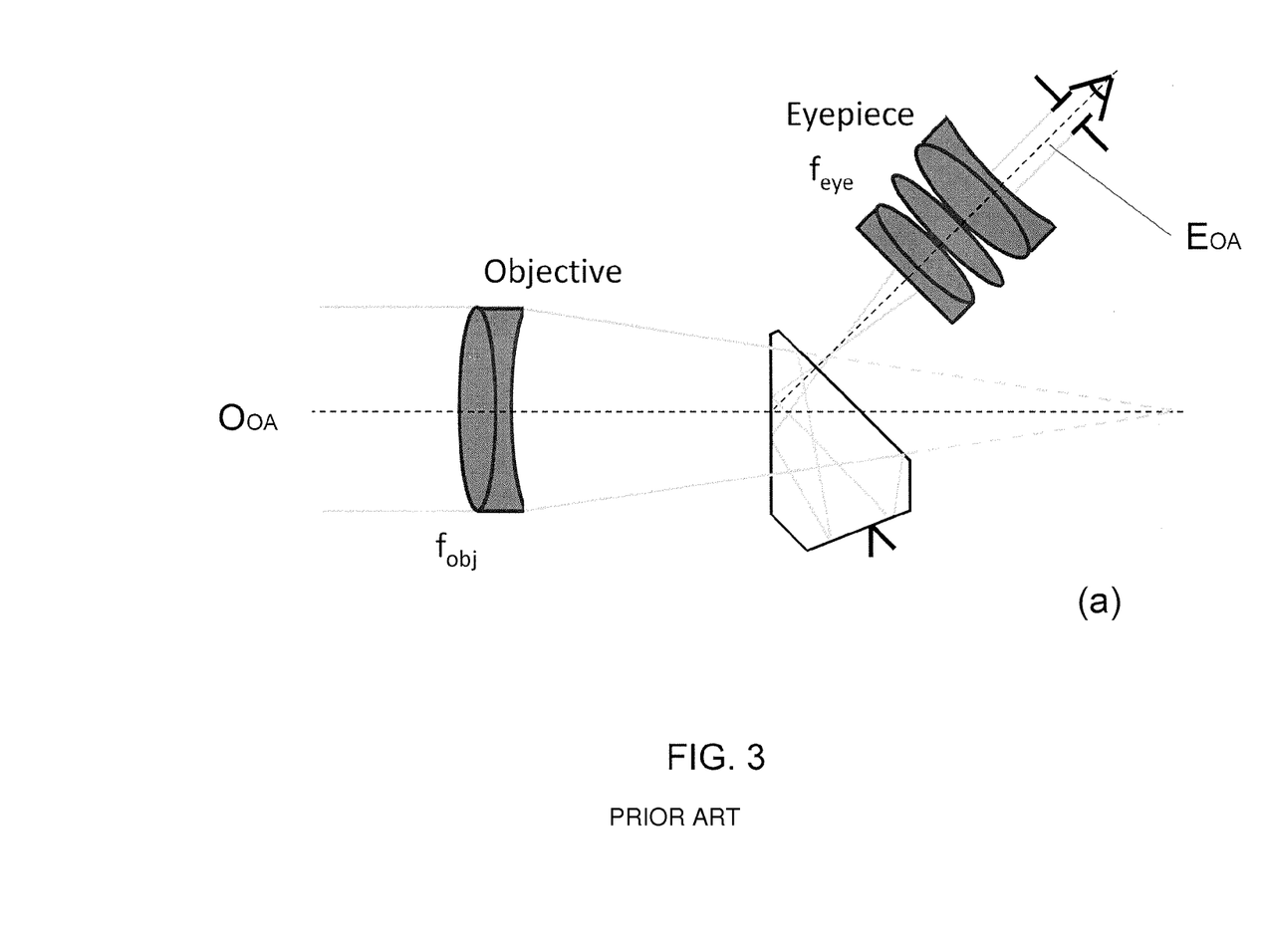
FIG. 3a is a schematic, cross sectional view of a fixed angle optical viewing apparatus showing optical parameters meeting the specifications listed in Table 1.
FIG. 3b illustrates FIG. 3a in a different orientation of use, according to illustrative embodiments of the invention.

According to an exemplary aspect as illustrated in FIG. 3, the system is a fixed deviated angle design using a Schmidt prism, having an 8× magnification, an eye relief (ER)=20 mm; $f_{obj}$=142 mm, $f_{eye}$=17.8 mm, as set forth in Table 1.

TABLE 1

| Magnification | 8x |
|---|---|
| Diameter of Entrance Pupil | 42 mm |
| Real Full Field of View | 6 deg. |
| Eye Relief | 20 mm |
| Eyepiece Line of Sight (LOS) wrt Horizontal | 30 deg. |
| Objective Line of Sight (LOS) wrt Horizontal | 0-60 deg. |

Figure 4:
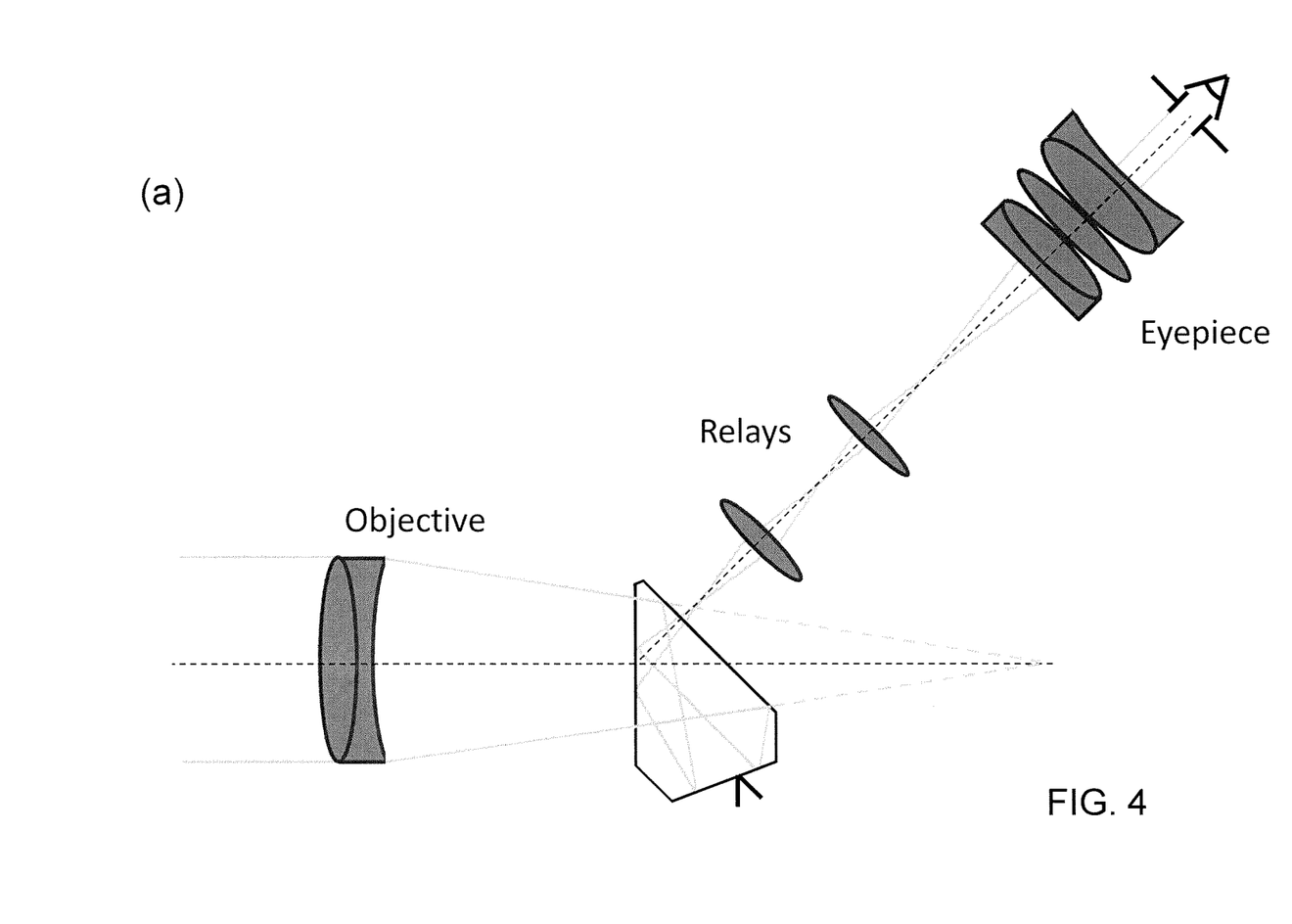
FIG. 4a is a schematic, cross sectional view of a fixed angle optical viewing apparatus.
FIG. 4b illustrates FIG. 4a in a different orientation of use, according to illustrative aspects of the invention.

FIG. 4a schematically illustrates an alternative fixed deviated angle design using a Schmidt prism in which a series of 1:1 relay lenses are disposed between the prism and the eyepiece to maintain an upright image while increasing the overall optical path of the apparatus. FIG. 4b shows the system of FIG. 4a in a different orientation of use.

Figure 5:
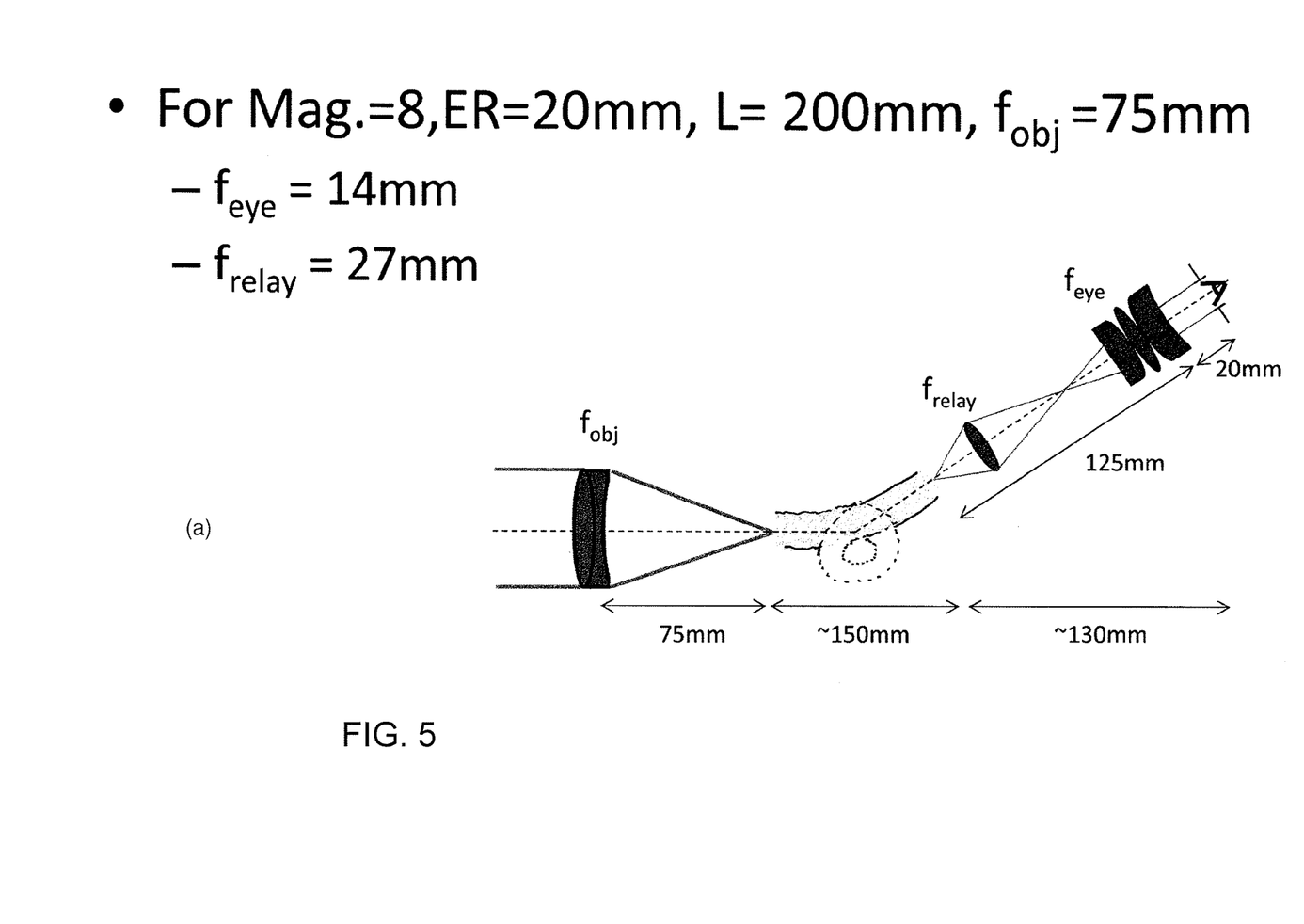
FIG. 5a is a schematic, cross sectional view of a fiber-based optical viewing apparatus.
FIG. 5b is a schematic, cross sectional view of a fiber-based optical viewing apparatus showing optical parameters meeting the specifications listed in Table 1.
FIG. 5c is a schematic, cross sectional view of a fiber-based optical viewing apparatus, according to illustrative aspects of the invention.
Figure 6:
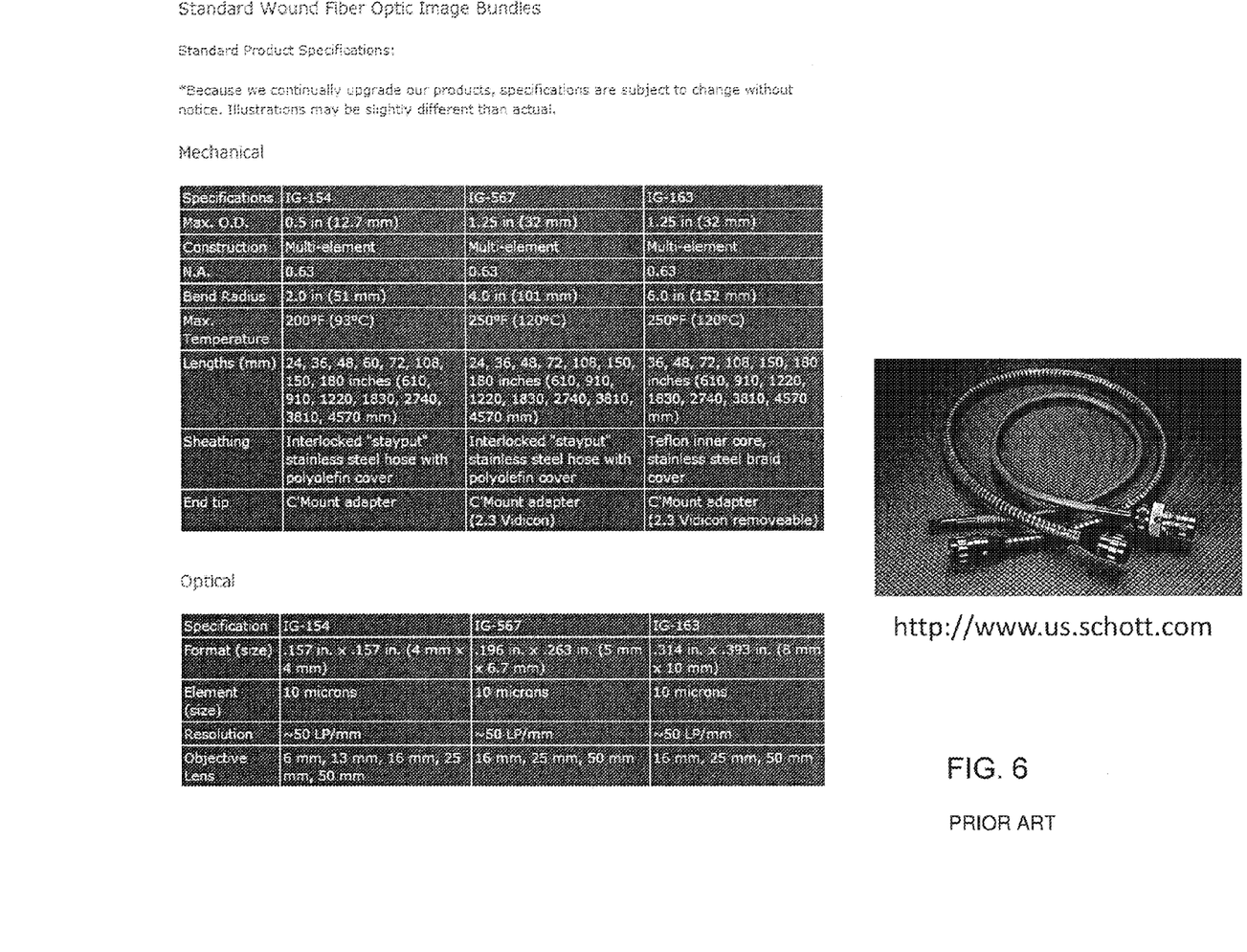
FIG. 6 is a photograph of two standard wound fiber optic image bundles available from Schott Optical Corp.

In another embodiment illustrated with reference to FIGS. 1, 5, and 6, the binocular is designed to have a variable deviation angle between the objective and eyepiece optical axes. This is accomplished, e.g., by using a fiber optic bundle in each telescope as the optical component or optical system $140_{(R, L)}$. As shown in FIGS. 5a and 6, a fiber bundle in the configuration of a loop allows the angle θ between the fiber bundle ends to be variably adjusted between zero and 90 degrees or more, and locked into a fixed deviation angle that the user finds convenient and comfortable via a control on the housing (not shown). FIGS. 5b, c show a fiber bundle that is not in a loop, but bendable over a finite radius less than 90 degrees. Accordingly, the binocular can be adjusted to have a straight line of sight as in a typical binocular, or be adjusted to have a deviated line of sight. As such, when the optical axes are deviated, a user does not have to hold the binoculars upwardly from the horizontal in order to view an object located upwardly from the horizontal. FIG. 5a further illustrates a variably adjustable binocular design having an overall length L=200 mm, an 8× magnification, ER=20 mm, $f_{eye}$=14 mm, $f_{obj}$=75 mm, and $f_{relay}$=27 mm.

It is envisioned that the eyepiece component of such an apparatus could be replaced with a viewing screen (LCD, LED, plasma, OLED, others known in the art) similar to that found on a digital camera. It is further envisioned that acoustic or other sound-tracking components could be coupled to the viewing apparatus to further assist in spotting the object to be viewed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The term "about" when prefacing a dimension means the exact value of the recited dimension or substantially the value of the recited dimension within a reasonable accuracy tolerance as understood by a person skilled in the art.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

I claim:

1. A pair of binoculars apparatus, comprising:
   a hand-held housing having a 'pair of binoculars' form factor that enables a subject viewer to support the pair of binoculars apparatus in the subject viewer's hands during operational use of the pair of binoculars apparatus to view a skyward object by supporting the binocular apparatus with the subject viewer's hands,
   wherein said pair of binoculars apparatus must be supported by at least one of the subject viewer's hands during operational use of the pair of binoculars apparatus to view the skyward object,
   wherein an unaided line of sight between the subject viewer and a distant, skyward object to be viewed is inclined upwardly at an angle from a horizontal line of sight of the subject viewer and an objective optical axis of the binocular apparatus is inclined upwardly at an angle from a horizontal line of sight of the subject viewer between the subject viewer and the distant object to be viewed;
      two eyepiece components each having an eyepiece optical axis, wherein said eyepiece optical axes are co-parallel, mounted in the housing;
      two objective components each having an objective optical axis, wherein said objective optical axes are co-parallel, mounted in the housing; and
      an image transfer component disposed in the housing between, and optically coupled to, the eyepiece components and the objective components,
   further wherein the eyepiece optical axes and the objective optical axes are neither parallel nor collinear.

2. The pair of binoculars apparatus of claim 1, wherein the eyepiece optical axes and the objective optical axes are disposed at an angle that is greater than zero degrees and equal to or less than 90 degrees.

3. The pair of binoculars apparatus of claim 2, wherein the angle is adjustable.

4. The pair of binoculars apparatus of claim 1, wherein the image transfer component is a flexible optical fiber bundle.

5. A pair of binoculars apparatus, comprising:
   a hand-held housing having a 'pair of binoculars' form factor that requires the pair of binoculars apparatus to be held in at least one hand of a subject viewer to view a skyward object;
   two eyepiece components each having an eyepiece optical axis, wherein said eyepiece optical axes are co-parallel, mounted in the housing;
   two objective components each having an objective optical axis, wherein said objective optical axes are co-parallel, mounted in the housing; and
   an image transfer component disposed in the housing between, and optically coupled to, the eyepiece components and the objective components,
   wherein the eyepiece optical axes and the objective optical axes are adjustable between an orientation where they are neither parallel nor collinear to an orientation where they are parallel or collinear.

6. The pair of binoculars apparatus of claim 5, wherein the image transfer component is a flexible optical fiber bundle.

7. The binocular apparatus of claim 1, further wherein the eyepiece component comprises a display screen having viewing axis that is neither parallel to nor collinear with the objective component optical axis, said axes lying in planes that intersect at a location in-between the location of the display screen component and the objective component.

8. The binocular apparatus of claim 5, further wherein the eyepiece component comprises a display screen having viewing axis that is neither parallel to nor collinear with the objective component optical axis, said axes lying in planes that intersect at a location in-between the location of the display screen component and the objective component.

9. The binocular apparatus of claim 1, further comprising a sighting aid.

10. The binocular apparatus of claim 9, wherein the sighting aid is at least one of a laser pointer and an aiming indicia.

11. The binocular apparatus of claim 5, further comprising a sighting aid.

12. The binocular apparatus of claim 11, wherein the sighting aid is at least one of a laser pointer and an aiming indicia.

\* \* \* \* \*